United States Patent [19] [11] Patent Number: 4,860,499
Dinger et al. [45] Date of Patent: Aug. 29, 1989

[54] APPARATUS FOR MEASURING GRINDING FORCES ON CERAMIC PARTS

[75] Inventors: Bruce R. Dinger, Davison; Mark R. McClanahan, Clio; David B. Quinn, Grand Blanc; Frederick Kennard, Holly, all of Mich.

[73] Assignee: General Motors Corporation, Detroit, Mich.

[21] Appl. No.: 204,832

[22] Filed: Jun. 10, 1988

[51] Int. Cl.$^4$ ............................................. B24B 5/32
[52] U.S. Cl. ............................. 51/165.74; 51/103 C; 51/103 WH; 73/862.06; 82/165; 408/2; 409/133
[58] Field of Search ......... 51/103 R, 103 C, 103 WH, 51/106 R, 108 R, 165 R, 165.71, 165.74, 283 R, DIG. 33; 73/78, 104, 146, 862.06; 82/28 R, 30, 38 R, 40 R; 408/2, 7, 11, 12; 409/133, 147, 148, 193, 194, 195

[56] References Cited

U.S. PATENT DOCUMENTS 3,914,907 10/1975 Hofelt, Jr. et al. ............ 51/DIG. 33
3,927,561 12/1975 Schleimann ........................ 73/146
4,485,681 12/1984 Hatamura ................... 73/862.06 X
4,671,147 6/1987 Komanduri et al. ............ 73/104 X
4,753,110 6/1988 Burchett et al. .................... 73/146

FOREIGN PATENT DOCUMENTS 2906892 9/1980 Fed. Rep. of Germany ........ 408/11
131147 7/1985 Japan ................................. 51/165 R

OTHER PUBLICATIONS

IBM Technical Disclosure Bulletin, "Spin Grinding Small Parts", T. W. Townsend, vol. 13, No. 12, May 1971 51/103 R.

Primary Examiner—Robert P. Olszewski
Attorney, Agent, or Firm—C. R. Meland

[57] ABSTRACT

A spark plug grinding machine is equipped with force sensors to measure grinding forces and other forces attendant to a grinding operation. Ceramic spark plug insulators are carried by spindles on a Ferris wheel into a grinding station. A control wheel engages and spins each part as a grinding wheel grinds the surface of the insulator. A three axis transducer on one of the spindles measures force components along the axis of the spindle, parallel to a tangent of the grinding wheel and in a radial direction. A torque sensor on the control wheel measures the torque as the wheel rotates each insulator. Either or both of the sensors may be used. They are coupled through slip rings to a recorder.

6 Claims, 4 Drawing Sheets

APPARATUS FOR MEASURING GRINDING FORCES ON CERAMIC PARTS

FIELD OF THE INVENTION

This invention relates to apparatus for measuring the forces imposed on a ceramic part during grinding and particularly for measuring the contour grinding forces of unfired ceramic spark plug insulators.

BACKGROUND OF THE INVENTION

The contour grinding of unfired "green" ceramic spark plug insulators is one of the critical steps of the spark plug manufacturing process. Excessive grinding forces during this stage result in reduced yields due to part breakage and/or cracking. Many parameters affect grinding. These factors include: the blank size and shape, the blank forming pressure, the control means speed and condition, the durometer of the control wheel tire, grinding wheel type and condition, etc. In order to optimize the grinding process and therefore to increase yields and throughput, instrumentation for measuring the forces that occur during grinding is desirable. Such instrumentation can also be used to optimize the machine setup, to determine process trends, and as a tool in the development of new designs and materials. Additionally, closed loop control circuits can be incorporated on the grinders, such that the process controller would automatically monitor the operation and shut it down if the grinding forces exceeded preset limits or make corrective adjustments.

As evidenced by the U.S. Pat. No. 2,091,973 to Fessler et al it has long been known grind the unfired spark plug insulator by rotatably supporting it on a spindle, rotate the insulator by a driving wheel applied to the outer surface of the insulator, and applying a shaped grinding wheel to the insulator in opposition to the driving wheel. Although the grinding equipment has been much improved and automated since the time of that patent, the same basic support, driving and grinding forces are employed and the equipment has not, prior to this invention, incorporated means for measuring the forces. Even when major grinding equipment changes are contemplated, the desirability of measuring the forces on the part remains. The need for such measurement is in no way limited to spark plug manufacture since other ceramic parts such as bushings or oxygen sensors undergo grinding and have similar hazards to be avoided or benefits to be gained during their manufacture.

SUMMARY OF THE INVENTION

It is therefore an object of the invention to provide an apparatus for measuring the forces on a ceramic part during grinding of the part.

The invention is carried out by apparatus for grinding a ceramic part and measuring grinding force on the part comprising; a spindle for holding the part for rotation, means for imposing grinding forces on the part comprising control means and a grinding wheel, the control means for engaging the part to impart rotation to the part, the grinding wheel for engaging the part in opposition to the control means such that forces imparted by the grinding wheel and the control means to the part interact and resultant components are transferred to the spindle and to the control means, and transducer means on at least one of the spindle and the control means for measuring at least one grinding force component.

The invention contemplates apparatus for measurement of forces on one of the spindle or the control means. It further contemplates apparatus for combined measurements.

BRIEF DESCRIPTION OF THE DRAWINGS

The above and other advantages of the invention will become more apparent from the following description taken.. in conjunction with the accompanying drawings wherein like references refer to like parts and wherein.

DESCRIPTION OF THE PREFERRED EMBODIMENT

The embodiment of the invention to be described is applied to the grinding of sparks plug blanks and uses a control wheel in opposition to a grinding wheel to impart rotational and other forces on the blanks. The invention applies as well to the grinding of other ceramic parts and other control means may be employed instead of a wheel. For example, a motor driven control belt drivingly engaging the parts can be used in place of a control wheel.

Figure 1:
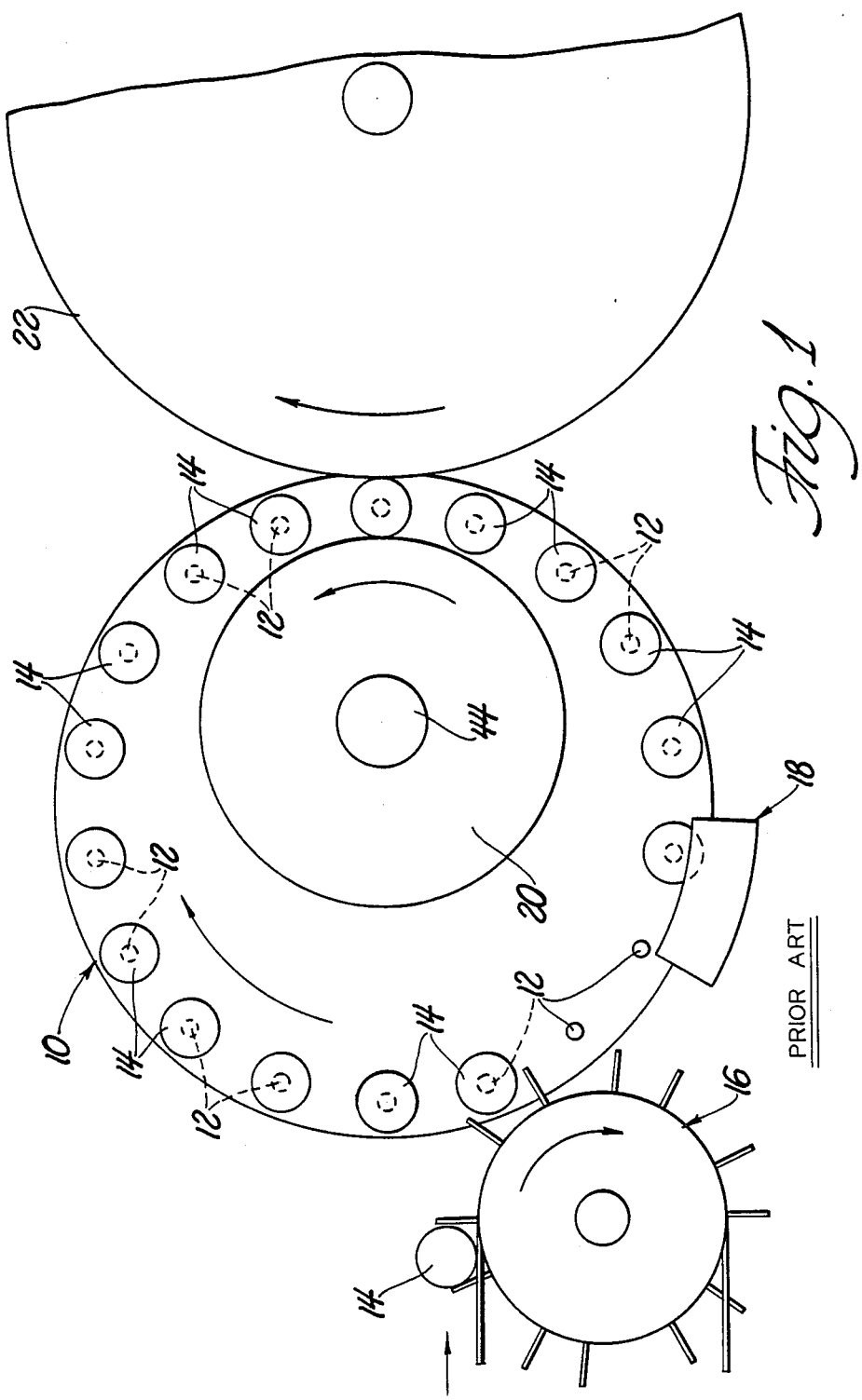
FIG. 1 is a schematic plan view of a prior art spark plug insulator grinding apparatus suitable for equipping with force measuring apparatus according to the invention.

A diagram of the spark plug grinding apparatus is shown in FIG. 1. A Ferris wheel 10 carries eighteen spindles 12 for carrying the ceramic parts 14 from a loading station to a grinding station and then to an unloading station 18. A loader 16 installs a part on each spindle 12 as the rotating Ferris wheel brings a spindle to the loader. A control wheel 20, driven by a motor 21 (see FIG. 2) and disposed within the circular array of spindles 12, has its axis of rotation parallel to that of the Ferris wheel 10 and is set to drivingly contact the parts 14 as they pass through the grinding station. A grinding wheel 22 outside the circular array of spindles 12 is arranged in opposition to the control wheel 20 and is positioned to grind the outer circumference of each part as it passes between the control wheel 20 and the grinding wheel 22. The rim of the grinding wheel 22 is formed to grind the desired shape on the parts.

In operation, spark plug blanks 14 are automatically loaded onto the spindles 12 at the loading station. The Ferris wheel 10 turns at a rate of 1-2 RPM to index the blanks clockwise to the grinding station. The control wheel 20, which spins at a rate of 300 to 500 RPM, contacts the blanks 14 as they approach the grinding wheel 22 and spins the blanks. As each blank 14 rotates it is uniformly ground by the grinding wheel 22 for approximately one second before it leaves the grinding station. Thus the chief operative forces determining grinding, herein called the grinding forces, are the forces imposed on the blanks by the control wheel 20 and the grinding wheel 22. As thus far described, the apparatus is a well known commercially available machine.

Figure 2:
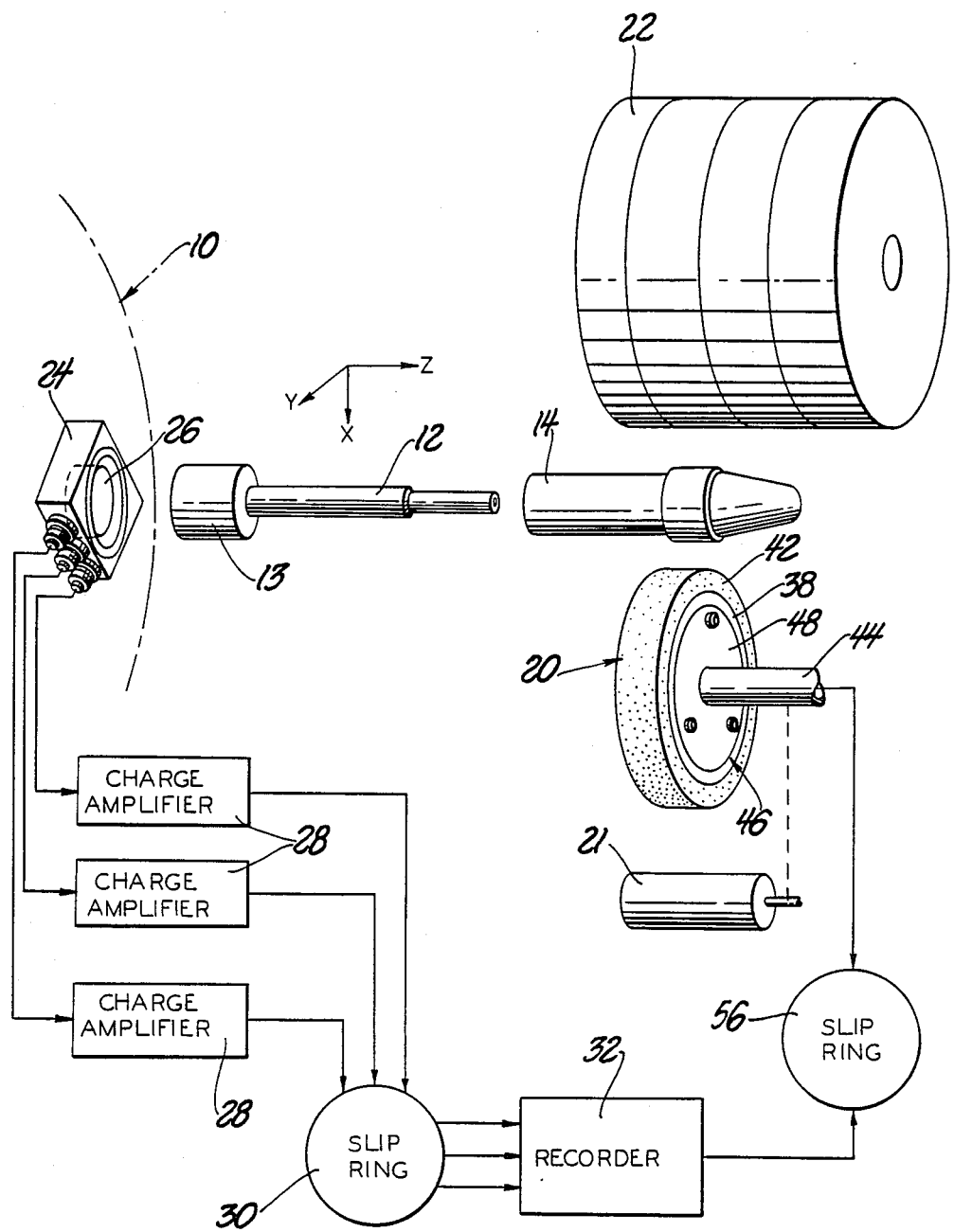
FIG. 2 is an exploded diagrammatic view of the apparatus of FIG. 1 equipped with complete force measurement instrumentation according to the invention.

To make the measurements contemplated by the invention, two types of force transducers are added to the apparatus: a three-axis transducer for sensing forces on a spindle 12 and a torque sensor on the control wheel 20, as shown in FIG. 2. Each transducer yields at least one output responsive to the grinding forces. Depending on the information being sought, either type of transducer can be applied to the grinding apparatus. It is also desirable in some cases to have both kinds of transducers on the same machine. Other transducers can be applied as well, or instead of those described, since there are a variety of ways to make the desired measurements. For example, the voltage and current of the control wheel drive motor can be monitored to determine control wheel torque.

Figure 3:
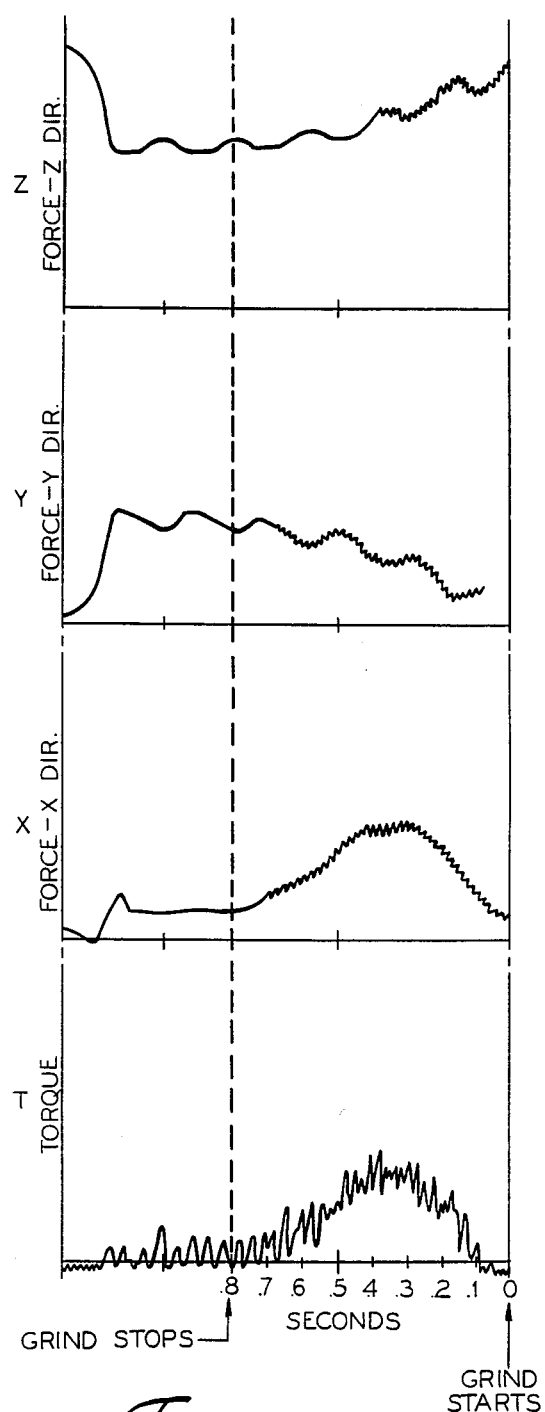
FIG. 3 comprises graphs X, Y and Z of spindle force measurements in the x, y, and z directions respectively, and graph T of a control wheel torque measurement, all taken through a grinding period.

The three-axis force transducer assembly is mounted on the Ferris wheel 10. The transducer 24 is a quartz transducer such as a Kistler model 9251A three component force transducer which is about one inch square and one-quarter inch thick, and includes a socket 26 for receiving a spindle 12. The base of the spindle 12 comprises a barrel 13 which seats in the socket 26. The transducer is able to measure force components in the x direction, tangential to the grinding wheel; the y direction, generally radial to the grinding wheel; and the z direction, along the spindle axis. The transducer output signals are electrical charges and it is necessary to condition the signal to a voltage by three charge amplifiers 28. The voltage signals are passed through a rotary slip ring 30 on the Ferris wheel 10 axis to a chart recorder 32. Examples of the signals generated by the transducer 24 for the components in the x, y, and z direction are shown in the graphs of FIG. 3. The time scale runs counter to the usual direction so that the start grinding signal is at the right side of each graph.

Figure 4:
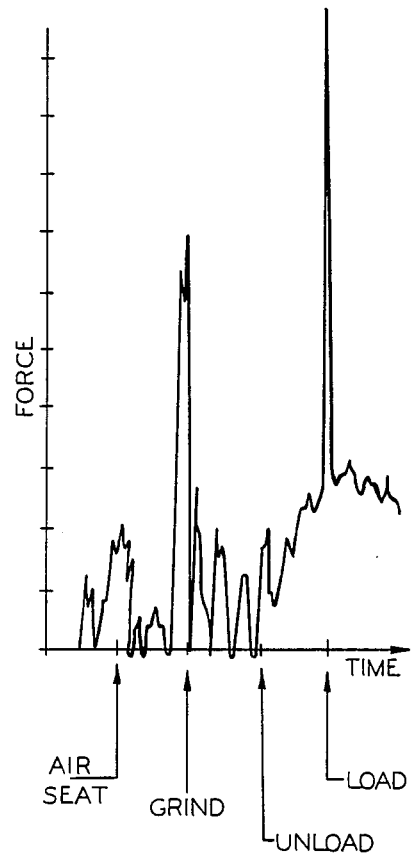
FIG. 4 is a graphical illustration of the spindle axial force measurement taken through a complete Ferris wheel revolution.

An advantage of the instrumented spindle is that it is in contact with the part 14 for a period longer than the grinding operation and thus can sense other events that affect the part. The graph of FIG. 4, for example, shows the z component of the spindle force throughout a revolution of the Ferris wheel. Voltage peaks are measured and events identified for seating the part on the spindle by an air jet, grinding, unloading and loading. Thus such data can reveal whether any of these functions is the cause of harmful forces. A disadvantage is that it is impractical to instrument all of the spindles on the machine because of the size and expense of the charge amplifiers. Typically one spindle can be instrumented so that only one out of eighteen parts is subject to the measurements.

Figure 5:
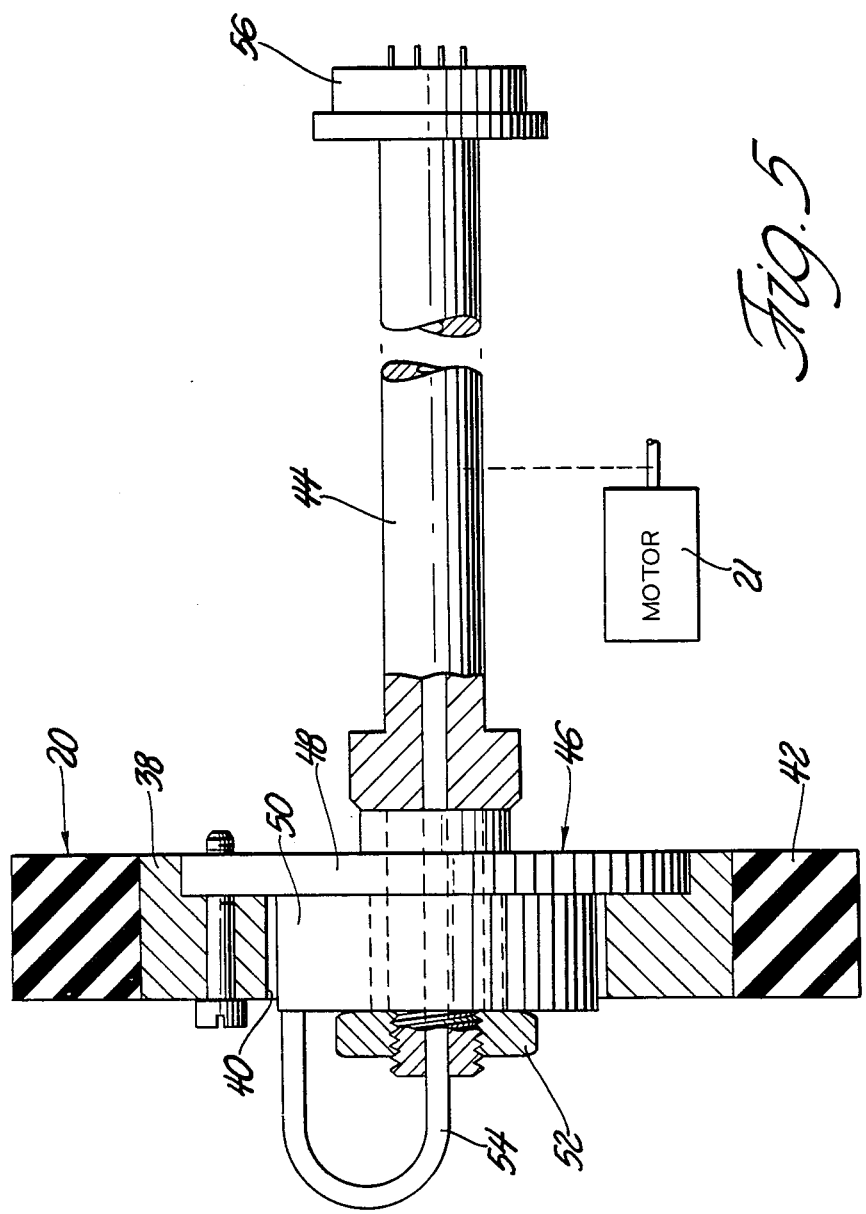
FIG. 5 is a cross-sectional elevation of a control wheel of the apparatus of FIG. 1 equipped with force measurement instrumentation according to the invention.

The control wheel torque sensor is best shown in FIG. 5. The control wheel 20 itself comprises a steel hub 38 having an enlarged stepped bore 40, and carries a rubber tire 42 for contacting the parts 14. A hollow shaft 44 for driving the control wheel 20 is coupled to the wheel 20 by the torque sensor 46 which is keyed to the shaft 44 and fits within the stepped bore 40 of the hub 38. The sensor 46 has a flange 48 bolted to the hub 38, and a body 50 keyed to the shaft 44 and coupled to the flange 48 through a load cell (not shown). A nut 52 secures th assembly to the shaft 44. A cable 54 from the load cell passes through the shaft 44 to a slip ring 56 which allows signals from the sensor to be coupled to the recorder 32.

When a part 14 touches the control wheel 22, the resulting torque will be measured. The torque signal from the torque sensor during the grinding operation is shown in FIG. 3, graph T. It is similar to the tangential force measurement of FIG. 3, graph X and the signals have the same general shape, although the torque sensor 46 has more noise in its output. In both cases the force or torque is low at the beginning of the grind period and builds to a peak at 0.3 or 0.4 seconds. Then the signal decreases until 0.8 seconds where grinding stops. Then the part is in a momentary dwell to insure complete grinding. The low force during the dwell is evident in the torque signal and the x-axis signal. An advantage of the torque sensor 46 on the control wheel 20 is that the grinding force on every part is measured and the instrumentation cost is low. Moreover, much can be learned about the grinding process from the torque signal. The magnitude of the torques during grinding can be used to identify potential problems such as defective mold blanks, grinding wheel build up, etc.

The y-axis forces reflect the radial forces imposed on the spindle by the control wheel and the grinding wheel. Since the grinding wheel inherently removes material which would press against it, the chief y-axis force on the spindle is from the control wheel. That force increases as the part enters the grinding zone and reaches a maximum when the part is closest to the control wheel axis. This occurs at the dwell position when the part is centered between the control wheel 20 and the grinding wheel 22. The maximum value remains during the dwell period. The size and condition of the control wheel can be deduced from the y-axis force, a new wheel 20 being positioned slightly closer to the part 14 to yield a higher force and a worn wheel yielding a lower force.

The magnitudes of the signals are subject to many material and process parameters and reveal material or process anomalies during grinding. For example if the feed rate is too great for a given part or for a certain material the signal amplitude will be too high. Similar results obtain if the control wheel speed is too low. By recognizing this, suitable adjustments can be made in the feed rate or other aspects of the process to avoid forces high enough to break the ceramic parts. A feed back control responsive to the torque is also feasible so that automatic changes in the process are made as required to optimize the operation or to shut down the operation if the forces exceed preset limits.

It will thus be seen that the subject measuring apparatus is useful in the setup and control of the grinding of spark plug blanks and other ceramic parts and provides an embodiment for three axis force measurement throughout the travel of a part on the Ferris wheel and an embodiment for measuring control wheel torque during every grinding operation to determine the force on each part and the trend over a number of parts. In view of the above teachings, many variations on the apparatus will be apparent without departing from the spirit of the invention.

The embodiments of the invention in which an exclusive property or privilege is claimed are defined as follows:

1. An apparatus for grinding a ceramic part and measuring grinding force on the part comprising;
   a spindle for holding the part for rotation, means for imposing grinding forces on the part comprising a control means and a grinding wheel, the control means for engaging the part to impart rotation to the part, the grinding wheel for engaging the part in opposition to the control means such that forces imparted by the grinding wheel and the control means to the part interact and resultant components are transferred to the spindle and to the control means, and a transducer on said spindle for measuring at least one grinding force equipment.

2. The invention as defined in claim 1 wherein the spindle is supported at a base portion, and wherein said transducer is coupled to the spindle base portion to measure grinding force components imposed on the part.

3. The invention as defined in claim 1 wherein the spindle is supported at a base portion, and wherein said transducer is a three axis transducer that is coupled to the spindle base portion to measure mutually perpendicular forces imposed on the part parallel to the spindle axis and perpendicular to the spindle axis, whereby grinding forces are measured.

4. The invention as defined in claim 3 wherein one of the measured forces perpendicular to the spindle axis is substantially tangent to the grinding wheel.

5. The invention as defined in claim 1 wherein the control means is a wheel driven by a rotatable shaft, and a load cell is coupled between the shaft and the wheel for sensing the driving force, whereby the driving force component of the grinding forces is measured by the load cell.

6. The invention as defined in claim 1 wherein the control means is a control wheel and a torque sensor is coupled to the control wheel for measuring the torque imparted by the control wheel to the part.

* * * * *